(12) United States Patent
Götzinger et al.

(10) Patent No.: US 11,492,206 B2
(45) Date of Patent: Nov. 8, 2022

(54) TRANSPORT TROLLEY

(71) Applicant: WEISS GMBH, Buchen (DE)

(72) Inventors: Martin Götzinger, Buchen (DE); Christian Insel, Buchen (DE); Lutz Neuweiler, Edingen-Neckarhausen (DE)

(73) Assignee: WEISS GmbH, Buchen (DE)

( * ) Notice: Subject to any disclaimer, the term of this patent is extended or adjusted under 35 U.S.C. 154(b) by 0 days.

(21) Appl. No.: 17/274,771

(22) PCT Filed: Sep. 10, 2019

(86) PCT No.: PCT/EP2019/074029
§ 371 (c)(1),
(2) Date: Mar. 9, 2021

(87) PCT Pub. No.: WO2020/053167
PCT Pub. Date: Mar. 19, 2020

(65) Prior Publication Data
US 2022/0081218 A1     Mar. 17, 2022

(30) Foreign Application Priority Data

Sep. 12, 2018 (DE) .......................... 102018122287.4

(51) Int. Cl.
  *B65G 35/06* (2006.01)
  *B65G 17/12* (2006.01)
  (Continued)

(52) U.S. Cl.
  CPC ......... *B65G 35/066* (2013.01); *B65G 17/123* (2013.01); *B65G 17/32* (2013.01);
  (Continued)

(58) Field of Classification Search
  CPC .... B65G 35/066; B65G 17/123; B65G 17/32; B65G 45/04; B65G 54/02; B65G 17/48;
  (Continued)

(56) References Cited

U.S. PATENT DOCUMENTS

| | | | |
|---|---|---|---|
| 2,987,013 A * | 6/1961 | Rosenbaum | B61B 13/04 104/120 |
| 3,048,127 A * | 8/1962 | Oberpaul | B61B 13/04 104/120 |

(Continued)

FOREIGN PATENT DOCUMENTS

| | | |
|---|---|---|
| DE | 69412213 T2 | 4/1999 |
| DE | 69413474 T2 | 5/1999 |

(Continued)

OTHER PUBLICATIONS

German Patent Office Communication dated May 9, 2019 for German Application No. 102018122287.4, 10 pages.

(Continued)

*Primary Examiner* — Mark A Deuble
(74) *Attorney, Agent, or Firm* — Dickinson Wright PLLC

(57) ABSTRACT

A transport trolley for transporting objects for a rail system having at least one rail that has at least three running surfaces, said transport trolley comprising:
  a base body having an object carrier for receiving at least one object;
  a roller support which is rotatably supported at the base body and at which at least a first, a second, and a third roller are rotatably supported; and
  an alignment system having a roller support alignment device for aligning the roller support relative to the base body and having a roller alignment device for a relative alignment of the rollers with respect to one another and/or to the base body.

21 Claims, 5 Drawing Sheets

Figure 1:
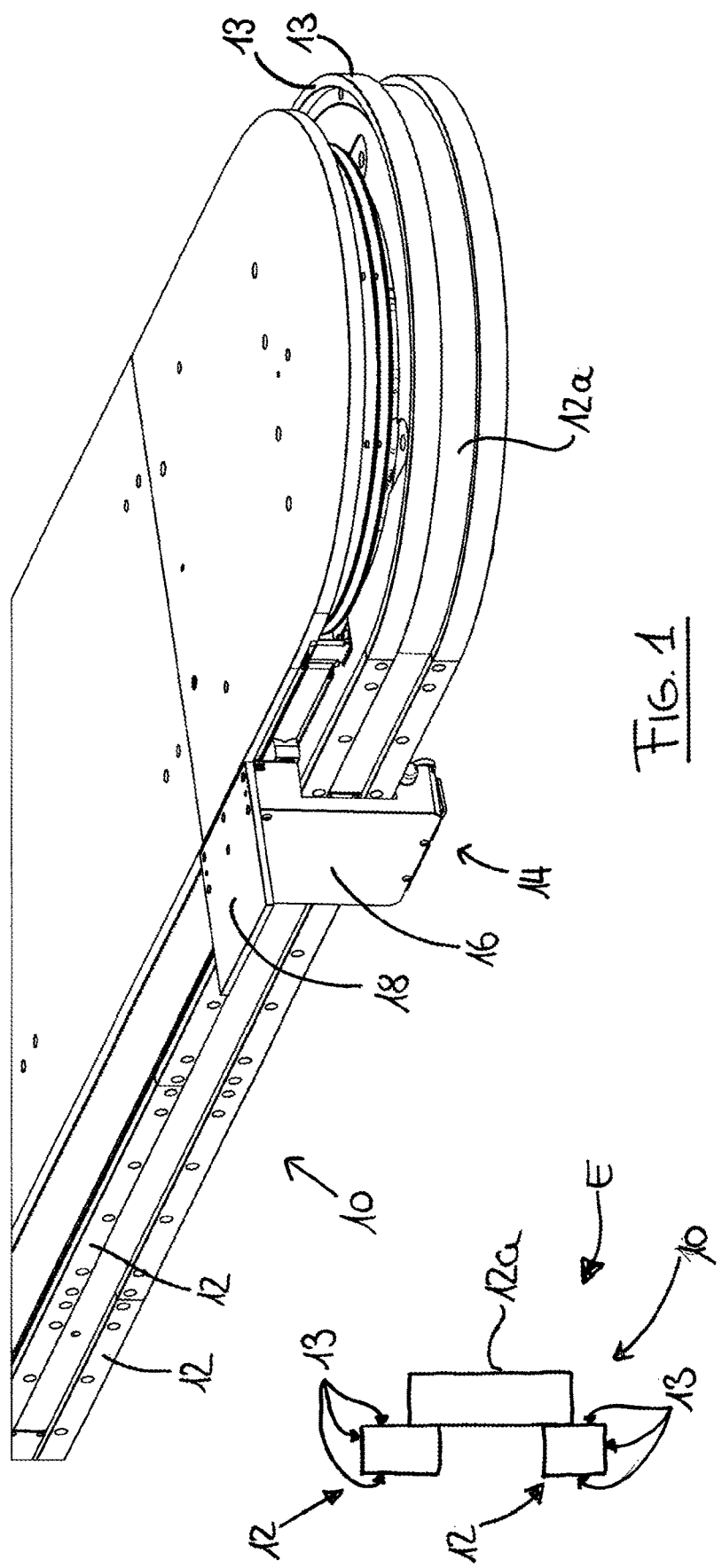

(51) Int. Cl.
  *B65G 17/32* (2006.01)
  *B65G 17/48* (2006.01)
  *B65G 45/04* (2006.01)
  *B65G 54/02* (2006.01)
(52) U.S. Cl.
  CPC ............. *B65G 17/48* (2013.01); *B65G 45/04* (2013.01); *B65G 54/02* (2013.01)
(58) Field of Classification Search
  CPC ........... B65G 17/485; B61B 3/00; B61B 3/02; B61B 3/04; B61B 3/06; B61B 10/022
  See application file for complete search history.

(56) References Cited

U.S. PATENT DOCUMENTS

| | | | | |
|---|---|---|---|---|
| 3,318,262 | A * | 5/1967 | Ganzinotti | E01B 25/24 104/155 |
| 4,248,157 | A * | 2/1981 | Evans | B61B 10/022 104/246 |
| 4,884,898 | A | 12/1989 | Magnuson | |
| 5,445,080 | A * | 8/1995 | Austin | B61B 13/04 105/241.1 |
| 5,492,066 | A | 2/1996 | Nozaki et al. | |
| 6,237,755 | B1 * | 5/2001 | Clopton | B65G 17/24 198/779 |
| 8,978,905 | B2 * | 3/2015 | Bergenstråle | B32B 37/0046 212/324 |
| 9,997,985 | B2 * | 6/2018 | Prüssmeier | H02K 11/215 |
| 10,894,675 | B2 * | 1/2021 | Hartung | B65G 54/02 |
| 2009/0266268 | A1 * | 10/2009 | Timan | B61B 13/04 105/157.1 |
| 2018/0111768 | A1 | 4/2018 | Pradelli et al. | |
| 2021/0253373 | A1 * | 8/2021 | Elsperger | B65G 54/025 |

FOREIGN PATENT DOCUMENTS

| | | |
|---|---|---|
| DE | 10106203 A1 | 9/2002 |
| DE | 10164478 A1 | 7/2003 |
| EP | 0656304 B1 | 8/1998 |
| EP | 2387920 A1 | 11/2011 |
| EP | 2653412 A1 | 10/2013 |
| EP | 3078617 A1 | 10/2016 |
| WO | 2015028223 A1 | 3/2012 |
| WO | 2012084648 A1 | 6/2012 |

OTHER PUBLICATIONS

International Search Report and Written Opinion, with English translation, dated Dec. 10, 2019 for PCT Application No. PCT/EP2019/074029, filed Sep. 10, 2019, 19 pages.

* cited by examiner

TRANSPORT TROLLEY

CROSS-REFERENCES TO RELATED APPLICATIONS

This patent application is a 371 of International Application No. PCT/EP2019/074029, filed Sep. 10, 2019 which claims the priority of German Application No. 102018122287.4, filed Sep. 12, 2018, each of which are incorporated herein by reference in their entirety.

The present invention relates to a transport trolley for transporting objects for a rail system having at least one rail that has at least three running surfaces.

Furthermore, the invention relates to a transport system comprising a rail system having at least one rail that has at least three running surfaces; and at least one transport trolley in accordance with the invention.

Transport trolleys and corresponding transport systems are, for example, used in automation technology to transport objects from one location to another location, for example, from one production step to the next. For this purpose, the objects are positioned on transport trolleys and the transport trolleys are traveled along a rail. The rail can in this respect have straight and/or curved sections.

In practice, value is particularly placed on the cornering ability of the system since systems that are not capable of cornering work discontinuously and their clock rates are limited. Furthermore, the rail systems should simultaneously have a high load-bearing capability and a good profile accuracy to be able to both transport high loads and ensure a high accuracy in the positioning of the transport trolleys and a low noise development on the transport.

It is also of essential importance that the transport trolleys or the transport systems work reliably and are nevertheless inexpensive in the manufacture and the assembly.

It is therefore the object of the invention to provide a transport trolley and a transport system that satisfy all of the above-mentioned requirements.

The object is satisfied by a transport trolley in accordance with claim 1 and by a transport system in accordance with claim 18.

A transport trolley in accordance with the invention comprises a base body having an object carrier for receiving at least one object; a roller support which is rotatably supported—e.g. by means of at least one rolling element bearing or sliding bearing—at the base body and at which at least a first, a second, and a third roller are rotatably supported; and an alignment system having a roller support alignment device for aligning the roller support relative to the base body and having a roller alignment device for a relative alignment of the rollers with respect to one another and/or to the base body. The roller support with the rollers supported thereat can in this respect be provided as a preassembled component assembly to simplify the assembly at the base body. The first, the second, and the third roller then preferably together engage around the rail at least in part. In this respect, it is irrelevant viewed from which spatial direction the rollers (partly) engage around the rail (e.g. from the side or from above) or which of the running surfaces absorbs the weight of the object carrier. In principle, it would also be conceivable that the rollers are arranged within the rail or that the rollers do not engage around the rail, but are rather pressed against it, for example by the roller support (e.g. from the inside to the outside). The rotatable support of the roller support can ensure, on the one hand, that the alignment of the object carrier, which is fastened to the base body, with respect to the rail can be flexibly set and, on the other hand, that the transport trolley is capable of cornering since the roller support can adapt to the course of the rail without the alignment of the object carrier relative to the rail changing. In addition to the rotatable support of the roller support, the alignment system is provided with its roller support alignment device and the roller alignment device and serves to ideally adapt the transport trolley to the rail system. Due to the alignment system, the transport trolley or the alignment of the transport trolley relative to the rail system can be flexibly set in preferably at least two spatial directions.

In accordance with an embodiment, axes of rotation of the first and second rollers are arranged in parallel with one other and an axis of rotation of the third roller is perpendicular to the axes of rotation of the first and second rollers. For example, the first and second rollers are in parallel with one another, while the third roller is arranged perpendicular and—if necessary—offset therefrom. The rollers can accordingly be arranged in a common plane that extends perpendicular to the transport direction or they can be offset from one another, viewed in the transport direction. Due to this alignment of the rollers, the transport trolley can move on a so-called rectangular rail in which the rollers engage around three sides or running surfaces of the rectangular rail or—in the case of a hollow section—press against them from the inside. Rectangular rails have the advantage in comparison with so-called V rails that larger payloads can be transported on them without the rails quickly having wear phenomena. It is nevertheless possible to achieve the necessary profile accuracy with rectangular rails.

An embodiment provides that the roller support is formed in one piece. A single-piece design of the roller support has proven to be particularly advantageous above all with respect to the production costs and the simplicity of the assembly.

In accordance with a further embodiment, the roller support alignment device has at least one spacer element for fixing a spacing and/or a position of the roller support with respect to the base body. The transport trolley can thereby be adapted flexibly and with an exact fit to the rail on which it moves and it is not restricted to just one very specific rail. The spacer element can be formed in one piece or in multiple pieces. It can also be set as required. For example, the spacer element comprises a corresponding setting mechanism (e.g. a screw mechanism) to be able to easily and accurately set the spacing and/or the position of the roller support with respect to the base body.

In accordance with a further embodiment, the spacer element is at least one disk that is insertable between the base body and the roller support. Such a disk can be formed as a spacer ring, for example. The thickness of such a spacer ring can vary depending on the application, transport trolley, and rail system and can be selected accordingly. The spacer element serves, on the one hand, together with the base body, to preload the transport trolley at the rail system and, on the other hand, to orient the object carrier, which serves as an interface between the transport system and the user, such that said object carrier always has the same height, above all when a plurality of transport trolleys are used at the same time. If required, the spacer element can also be formed obliquely or irregularly, for instance, in order to deliberately change or set a position of the roller support (e.g. its inclination) with respect to the base body.

It is also conceivable that the roller alignment device comprises a setting means for setting a spacing, a position, and/or an alignment of at least one roller relative to the roller support. Due to the setting means, the roller or the rollers can be adapted with an exact fit to the rail used. Above all when two rollers are aligned in parallel with one another and the rail is clamped between these two rollers, it is of great importance that the spacing of exactly these rollers can be adapted with an exact fit to the rail. The setting means, for example, allows the spacing between two rollers to be changed symmetrically to the roller support. However, it is also conceivable that the position of only one roller is changed and that the rollers are therefore no longer arranged symmetrically to the roller support. The settability by the setting means has proven to be particularly advantageous when transport trolleys have to be replaced or supplemented in an already existing rail system—for example as replacement parts. If required, the setting means can also be configured such that an inclination of an axis of rotation of the rollers is influenced.

In accordance with a further variant, a means for influencing the stiffness of the base body and/or of the roller support is additionally provided. This means can, for example, be an elastic element that introduces a certain elasticity into the base body and/or into the roller support. However, it would also be possible for the means to be implemented by a recess in the base body and/or in the roller support through which the base body or the roller support can stretch or compress locally up to a certain degree. A further possibility would also be to provide a spring in the base body and/or in the roller support. It is understood that all the variants can also be combined with one another.

A preferred embodiment provides that the means for influencing the stiffness is at least one slot in the base body and/or in the roller support. This slot can—as already mentioned above—bring about a certain stretchability of the base body and/or of the roller support. It would also be conceivable for an adjustment means, preferably a screw, a spring, or any desired elastic material, to be arranged in the slot—or in the aforementioned recess—in order to spread or compress it as required.

It is furthermore also conceivable that the slot is arranged substantially in parallel with the axis of rotation of at least one of the rollers. However, other alignments of the slot—for example obliquely—can also be implemented if required. Due to a parallel arrangement of the slot with the axis of rotation of a roller, the relative position and/or alignment of the roller with respect to the rail can be changed on a stretching.

In accordance with an embodiment, at least two rolling element bearings, in particular angular contact ball bearings, are provided for the rotatable support of the roller support. Angular contact ball bearings are particularly designed for supports in which combined loads occur such as simultaneously acting radial and axial loads. Angular contact ball bearings installed in pairs in particular enable both high running accuracies and a high stiffness.

In accordance with a further embodiment, a tensioning means is provided by which the at least two rolling element bearings can be preloaded toward one another. Such a preload can, for example, be increased or decreased by spacer rings, screws, or springs in that more or less pressure is exerted onto the bearings by the tensioning means.

The support of the roller support can also—additionally or alternatively—comprise one or more slide bearings. For example, the support is provided with a bolt-like bearing section that is directly or indirectly slidingly supported in the base body. An indirect support can comprise a bushing that receives the bearing section and that is fixed in the base body. To minimize the sliding friction, the bearing section, the base body, and/or—if present—the bushing can be provided with a coating, e.g. with a nickel Teflon coating.

An embodiment also provides that a counter-pressure element is provided at a side of the base body disposed opposite the object carrier, said counter-pressure element securing the transport trolley at the rail of the rail system, in particular under a preload. This has the effect that the transport trolley both achieves a sufficiently high running accuracy and cannot fall from the rail at high running speeds. The counter-pressure element can comprise a roller rotatably supported at the base body.

It is also conceivable that the counter-pressure element has a roller support which is rotatably supported at the base body and at which at least a fourth roller is rotatably supported, in particular at which at least three rollers are rotatably supported. In other words, the counter-pressure element could therefore be a further roller support that is substantially of the same construction and that has at least one roller.

A preferred embodiment provides that the counter-pressure element additionally has an alignment system having a roller support alignment device for aligning the roller support relative to the base body and/or having a roller alignment device for the relative alignment of the roller with respect to the base body and/or of the rollers—if more than one roller is present. The design of the transport trolley can at least be symmetrical with respect to its guide components, in particular in that the transport trolley has two roller supports that are substantially of the same design and that have two alignment systems that are substantially of the same design and that are arranged in mirror symmetry with respect to one another. However, the design of the transport trolley does not necessarily also have to be symmetrical since it can be decided as required how many rollers the counter-pressure element has.

In accordance with an embodiment, the transport trolley has at least one roller support, which has an alignment system, and at least one counter-pressure element that is configured as a roller rotatably supported at the base body. In addition, at least one roller pair is provided, said rollers being rotatably supported directly at the base body and being arranged disposed opposite one another with respect to the rail in the position of use of the trolley. Figuratively speaking, these rollers laterally engage around the rail. Moreover, they are arranged such that they cooperate with a section of the rail that is disposed opposite the rail section with which the rollers of the roller support cooperate. They can be adjustably arranged.

The above-described design is indeed not movable quite as precisely and practically jerk-free as a design with mutually oppositely disposed roller supports. However, it is less expensive to manufacture and sufficient for many applications.

In accordance with an embodiment variant, a lubrication unit is associated with at least one of the rollers, in particular with each of the rollers, and supplies the respective roller with a lubricant. The service life of the corresponding roller or of the rail system is thereby extended.

In accordance with a further embodiment variant, the roller support is substantially T-shaped. The vertical part of the T in particular serves—viewed in a cross-section—to support the roller support at the base body, while the "crossbar" supports the rollers.

Furthermore, a transport system is provided with a rail system having at least one rail, which has at least three running surfaces, and with at least one transport trolley in accordance with the invention.

In accordance with an embodiment of the system, at least two of the running surfaces are arranged in parallel with one another and/or at least two of the running surfaces are arranged at right angles to one another. A variant of the rail can be the above-described rectangular rail.

Figure 2:
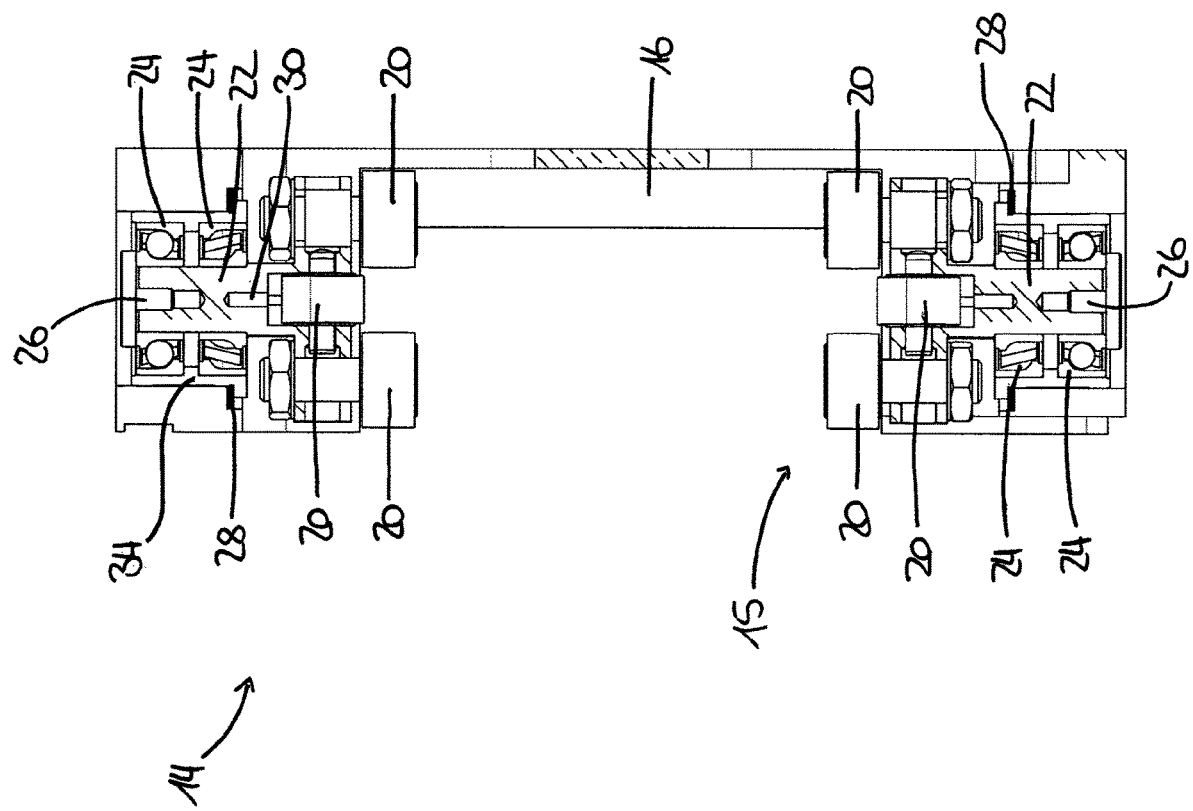
Figure 3:
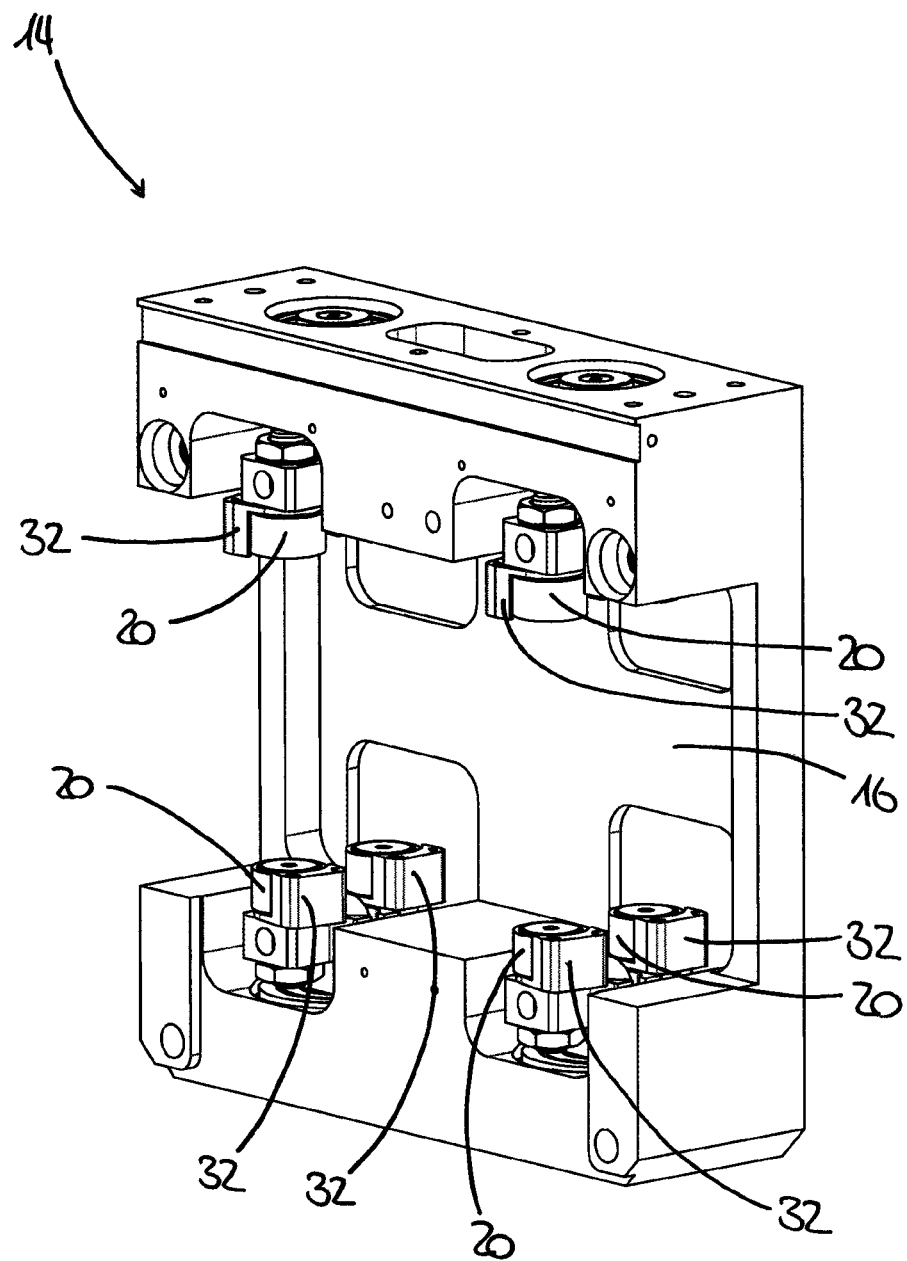
Figure 4:
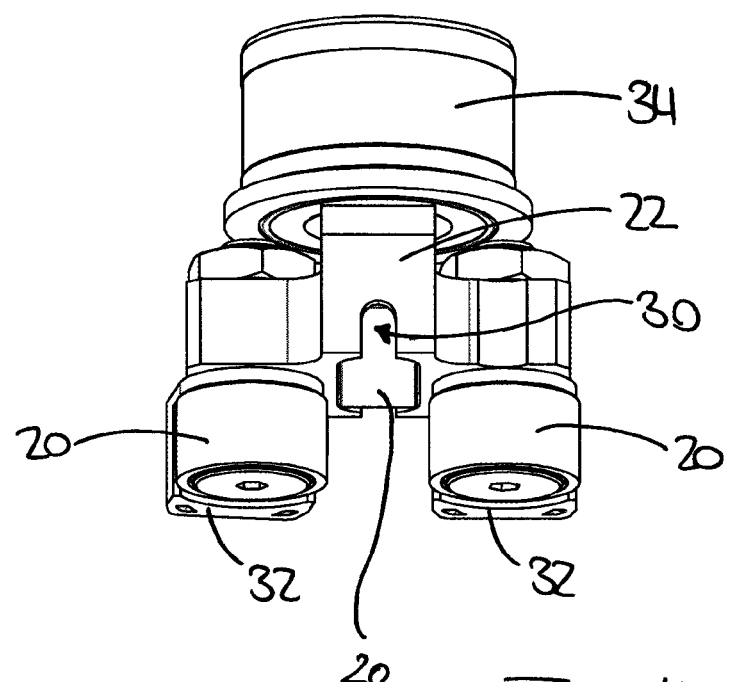

The invention will be described in more detail in the following purely by way of example with reference to the Figures. In these, there are shown:

FIG. 1: a rail system having a transport trolley;
FIG. 2: a section through a transport trolley;
FIG. 3 a transport trolley in a perspective view;
FIG. 4: a roller support body having rollers; and
FIG. 5: a section through a transport trolley in accordance with a second embodiment.

FIG. 1 shows a part of a rail system 10 having two peripheral rails 12 for guiding one or more transport trolleys 14. The drive of the transport trolley 14 can, for example, be mechanical (e.g. a belt drive, a cam cylinder drive, etc.) and/or electromagnetic (e.g. a linear motor).

The transport trolley 14 has a base body 16 and an object carrier 18 which is fixedly fastened thereto or rotatably supported thereat and on which objects (not shown) can be transported. The base body 16 can be formed both in one piece and in multiple parts—for example, in two parts. The multi-part design in particular simplifies the assembly and/or the placement of the transport trolley 14 onto the rail 12. A more detailed description of the transport trolley 14 will be discussed below with reference to FIGS. 2 and 3. It can furthermore be seen in FIG. 1 that the rails 12 are configured as so-called rectangular rails—that is have three running surfaces 13 of which two running surfaces 13 are in parallel with one another and the third is arranged at right angles thereto—and the transport trolley 14 engages around the rails 12 from the side. In addition, the rails 12 comprise both straight-line and curved sections.

A use E in FIG. 1 schematically shows a cross-section through the rail system 10. The two rails 12 with their respective running surfaces 13 can be recognized. The rails 12 are fastened to a rail support 12a.

To be able to move precisely and smoothly on the rails 12, the transport trolley 14 that is symmetrical by way of example here at least in a functional regard has two sets of three rollers 20 each (see FIG. 2). The rollers 20 are each rotatably supported at a T-shaped roller support 22. "Symmetrical design" is therefore to be understood such that a second, comparably designed roller support 22 having the same number of rollers 20 is provided as the counter-pressure element 15 and furthermore—as explained in more detail below—also has an alignment system that is designed to have the same effect at least functionally.

The roller supports 22 are in this respect rotatably supported at the base body 16 via a respective two angular contact ball bearings 24 preloaded toward one another. In the example shown, the preload of the angular contact ball bearings 24 is set via a tensioning means 26 in the form of a screw 26 that presses directly or indirectly against the angular contact ball bearings 24 from above or from below. The spacing or the alignment of the roller supports 22 relative to the base body 16 is defined via a spacer ring 28 in each case. The position or alignment in which the roller support 22 is respectively fastened to the base body 16 is defined depending on how thick the spacer ring 28 is or whether or not it is inserted at all. The spacer ring 28 is in particular selected so suitably that the transport trolley 14 is ideally adapted to the rail 12.

The stiffness of the roller supports 22 is defined by a respective means for influencing the stiffness in the form of a slot 30 in the roller support 22 that respectively extends in parallel with the base body 16 in the present example (see in particular FIG. 4). The slot 30 makes it possible that the spacing between the two rollers 20 arranged in parallel with one another is still passively variable up to a certain degree—depending on how elastic the material is from which the roller support 22 is produced—even during operation. In addition, it is thereby made possible that the rollers 20 in the curved parts of the rail 12 can be better adapted to the curved track, whereby the cornering ability of the transport trolley 14 is considerably improved. The shape and/or orientation of the slot 30 can be selected as required.

It can furthermore be seen from FIGS. 3 and 4 that each roller 20 has a lubrication unit 32 associated with it that supplies the respective roller 20 with lubricant in order to ensure a long service life of the rollers 20.

In addition, FIG. 4 also shows that the angular contact ball bearings 24 are each surrounded by a sleeve 34 in practice. For the assembly of the roller support 22, the sleeve 34 is inserted into a corresponding bore of the base body 16.

Figure 5:
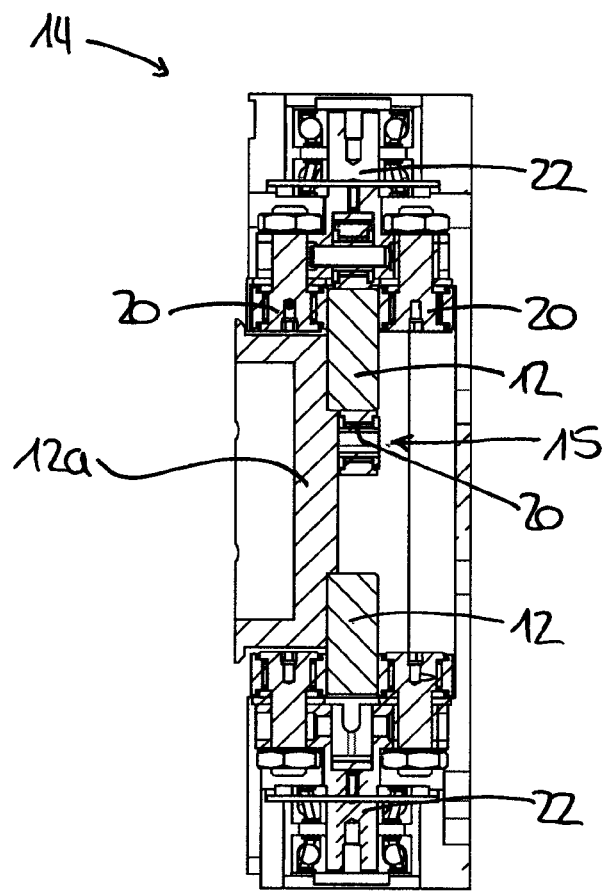

FIG. 5 shows a section through a transport trolley 14 in accordance with a second embodiment. A further single roller 20 that is rotatably supported at the base body 16 (optionally adjustable in its position) and that is disposed opposite the roller support 22 (with respect to the upper rail 12) is provided as the counter-pressure element 15 in this respect. Thus, it is possible to tension the roller support 22 and the rollers 20 supported thereat against the rail 12. The second roller support 22, which is associated with the lower rail 12, has only two rollers 20 that above all absorb tilting moments acting on the base body 16 (that are e.g. generated by objects arranged on the object support 18 and/or by their processing/handling by external apparatus). The roller 20 provided in FIG. 2 having a horizontally disposed axis of rotation of the lower support 22 is therefore not provided here.

Provision can be made to support the rollers 20, which are the lower rollers in FIG. 5, directly at the base body 16 so that the lower roller support 22 can be omitted. The rollers 20 will then, if required, be granted somewhat more clearance with respect to the rail 12 (e.g. depending on the curve radii of the rail that are to be expected) in order to avoid excessive tensioning during cornering.

As already explained, the structure for rail guidance, which is the lower structure in FIG. 2, is substantially the same as the upper one. It in particular also comprises an alignment system (spacer element, slot, etc.) designed in substantially the same manner in order to adapt the structure to the—in the present example—lower rail 12 as required. Such a—so-to-speak symmetrical—design of guide components of the transport trolley 14 enable the greatest possible flexibility on the assembly of the transport trolley 14 at the rail system 10. It is irrelevant in this respect whether the transport trolley 14, as in the present case, moves on two rails 12 or whether only one rail 12 is provided. The same applies analogously to the embodiment in accordance with FIG. 5—except for the "horizontal" roller 20 that is not present.

It would also be possible for the total—lower in the representation of FIG. 5—part of the transport trolley 14 to be omitted. The second roller support 22 would accordingly not be present since the extra roller 20 already secures the transport trolley at the upper rail 12.

A further, generally conceivable variant would also be that the additional roller 20 is provided beneath the lower rail 12 instead of the second roller support 22 and thus secures the transport trolley 14 across two rails 12 to the rail system 10.

For an ideal adaptation of the transport trolley 14 to a rail system 10 having at least one rectangular rail 12, at least one T-shaped roller support 22, at which three rollers 20 are rotatably supported and which is formed in one piece, is therefore provided in the present embodiment. The roller support 22 is rotatably supported at the base body 16 via two angular contact ball bearings 24 that are preloaded toward one another. The preload of these bearings 24 is preset by a tensioning means in the form of a screw 26.

The spacing or the alignment of the roller support 22 relative to the base body 16 of the transport trolley 14 is set by a spacer element (spacer ring) 28. In contrast, the spacing, or the position, and/or the alignment of the rollers 20 relative to the roller support is fixed by at least one setting means. This can, for example, be a screw by which the roller 20 is in each case fixedly screwed to the roller support 22 at a certain spacing.

Furthermore, another means for influencing the stiffness 30 of the roller support 22 is provided that is implemented by a slot 30 in the single-piece body of the roller support 22. The slot 30 provides a certain elasticity to the roller support 22 and thereby makes it possible that the rollers 20 can be ideally adapted to the rails 12 even if the rail 12 also has curved sections.

Due to the above-mentioned measures, which can be used individually or in any desired combination with one another, the transport trolley 14 can be ideally adapted to the rail 12 in at least two, preferably three, spatial directions—in particular to compensate the production tolerances of its components and/or of the total system.

The spatial arrangement of the rails 12 or of the transport trolleys 14 moving thereon can be selected as required. It is irrelevant for the transport trolleys 14 in accordance with the invention from which spatial direction their rollers 20 engage around the corresponding rail 12. Depending on the alignment of the transport trolley 14 with respect to the rail 12, only the alignment of the object carrier 18 has to be suitably selected so that objects can also actually be transported on the object carrier 18. It is irrelevant which of the rollers 20 absorbs the weight of the object carrier 18 in so doing.

I.e. the rail system can, for example, also comprise only one rail, in particular a rail having a rectangular cross-section, and/or the rail system is tilted, e.g. by 90°, with respect to the arrangement shown in the Figures. The guidance of the transport trolleys 14 still works reliably even then.

REFERENCE NUMERAL LIST 10 rail system
12 rail
12A rail support
13 running surface
14 transport trolley
15 counter-pressure element
16 base body
18 object carrier
20 roller
22 roller support
24 rolling element bearing
26 tensioning means
28 spacer element
30 means for influencing the stiffness
32 lubrication unit
34 sleeve
E use

The invention claimed is:

1. A transport trolley for transporting objects for a rail system having at least one rail that has at least three running surfaces, said transport trolley comprising:
   a base body having an object carrier for receiving at least one object;
   a roller support which is rotatably supported at the base body and at which at least a first roller, a second roller, and a third roller are rotatably supported; and
   an alignment system having a roller support alignment device for aligning the roller support relative to the base body and having a roller alignment device for a relative alignment of the rollers with respect to one another and/or to the base body.

2. The transport trolley in accordance with claim 1, wherein axes of rotation of the first and second rollers are arranged in parallel with one other and an axis of rotation of the third roller is perpendicular to the axes of rotation of the first and second rollers.

3. The transport trolley in accordance with claim 1, wherein the roller support is formed in one piece.

4. The transport trolley in accordance with claim 1, wherein the roller support alignment device has at least one spacer element for fixing at least one of a spacing and a position of the roller support with respect to the base body.

5. The transport trolley in accordance with claim 4, wherein the spacer element is at least one disk that is insertable between the base body and the roller support.

6. The transport trolley in accordance with claim 1, wherein the roller alignment device has at least one setting means for setting at least one of a spacing of at least one roller relative to the roller support, a position of at least one roller relative to the roller support, and an alignment of at least one roller relative to the roller support.

7. The transport trolley in accordance with claim 6, wherein at least one of a position and an alignment of the axis of rotation of at least one roller with respect to the roller support is variable by the setting means.

8. The transport trolley in accordance with claim 1, wherein at least one means for influencing the stiffness of at least one of the base body and the roller support is additionally provided.

9. The transport trolley in accordance with claim 8, wherein the means for influencing the stiffness is at least one slot in the base body and/or in the roller support.

10. The transport trolley in accordance with claim 9, wherein the slot is arranged substantially in parallel with the axis of rotation of at least one of the rollers.

11. The transport trolley in accordance with claim 1, wherein at least two rolling element bearings are provided for the rotatable support of the roller support.

12. The transport trolley in accordance with claim 11, wherein the rolling element bearings are angular contact ball bearings.

13. The transport trolley in accordance with claim 11, wherein a tensioning means is provided by which the at least two rolling element bearings can be preloaded toward one another.

14. The transport trolley in accordance with claim 1, wherein a counter-pressure element is provided at a side of the base body disposed opposite the object carrier, said counter-pressure element securing the transport trolley at the rail of the rail system.

15. The transport trolley in accordance with claim 14, wherein the counter-pressure element has a roller support which is rotatably supported at the base body and at which at least a fourth roller is rotatably supported.

16. The transport trolley in accordance with claim 14, wherein the counter-pressure element additionally has an alignment system having a roller support alignment device for aligning the roller support relative to the base body and/or having a roller alignment device for the relative alignment of the roller with respect to the base body and/or of the rollers if more than one roller is present.

17. The transport trolley in accordance with claim 1, wherein a lubrication unit is associated with at least one of the rollers and supplies the respective roller with a lubricant.

18. The transport trolley in accordance with claim 1, wherein a lubrication unit is associated with each of the rollers and supplies the respective roller with a lubricant.

19. The transport trolley in accordance with claim 1, wherein the rollers are substantially T-shaped.

20. A transport system comprising a rail system having at least one rail that has at least three running surfaces; and at least one transport trolley said transport trolley comprising:
- a base body having an object carrier for receiving at least one object;
- a roller support which is rotatably supported at the base body and at which at least a first roller, a second roller, and a third roller are rotatably supported; and
- an alignment system having a roller support alignment device for aligning the roller support relative to the base body and having a roller alignment device for a relative alignment of the rollers with respect to one another and/or to the base body.

21. The transport system in accordance with claim 20, wherein at least two running surfaces are arranged in parallel with one another and/or at least two of the running surfaces are arranged at right angles to one another.

\* \* \* \* \*